United States Patent
Parker et al.

(10) Patent No.: US 7,451,722 B2
(45) Date of Patent: Nov. 18, 2008

(54) INTERNAL TEMPERATURE MEASURING DEVICE

(76) Inventors: Robert Parker, 60617 Golf Village Loop, Bend, OR (US) 97702-9128; Robert Burton, 3009 Danalda Dr., Los Angeles, CA (US) 90064-4625

( * ) Notice: Subject to any disclaimer, the term of this patent is extended or adjusted under 35 U.S.C. 154(b) by 0 days.

(21) Appl. No.: 11/535,631

(22) Filed: Sep. 27, 2006

(65) Prior Publication Data
US 2008/0072813 A1    Mar. 27, 2008

(51) Int. Cl.
    G01K 11/12    (2006.01)
(52) U.S. Cl. .................. 116/216; 374/155; 374/162
(58) Field of Classification Search ............... 116/216, 116/221; 374/155, 161, 162; 99/342, 343, 99/344
See application file for complete search history.

(56) References Cited

U.S. PATENT DOCUMENTS

| | | | | |
|---|---|---|---|---|
| 3,877,411 A | * | 4/1975 | MacDonald | ............... 116/207 |
| 4,128,007 A | * | 12/1978 | Ulin | ........................... 600/549 |
| 4,339,951 A | * | 7/1982 | Yee et al. | ..................... 374/162 |
| 4,445,787 A | * | 5/1984 | Parker | ........................ 374/141 |
| 4,779,995 A | * | 10/1988 | Santacaterina et al. | ...... 374/162 |
| 5,622,137 A | | 4/1997 | Lupton, Jr. et al. | |
| 5,675,920 A | * | 10/1997 | Long | ........................... 40/301 |
| 5,685,641 A | | 11/1997 | Ribi | |
| 5,918,981 A | | 7/1999 | Ribi | |
| 5,919,404 A | * | 7/1999 | Fujita et al. | ................. 252/583 |
| 2005/0273126 A1 | * | 12/2005 | Beaupre | ..................... 606/169 |

FOREIGN PATENT DOCUMENTS

DE          3802516 A1 *  8/1989
WO     WO 01/51903 A1 *  7/2001

\* cited by examiner

*Primary Examiner*—R. A. Smith
(74) *Attorney, Agent, or Firm*—Renner, Otto, Boisselle & Sklar, LLP

(57) ABSTRACT

An inexpensive reusable device for measuring the temperature distribution in a substrate, such as meat, poultry, or fish, is disclosed. The device is easy to read, fast and convenient and low in cost without the use of batteries. The device, which utilizes thermochromic materials mounted on one or more metal carriers, can be inserted into or placed in contact with the substrate for determining the temperature gradient across the substrate.

17 Claims, 2 Drawing Sheets

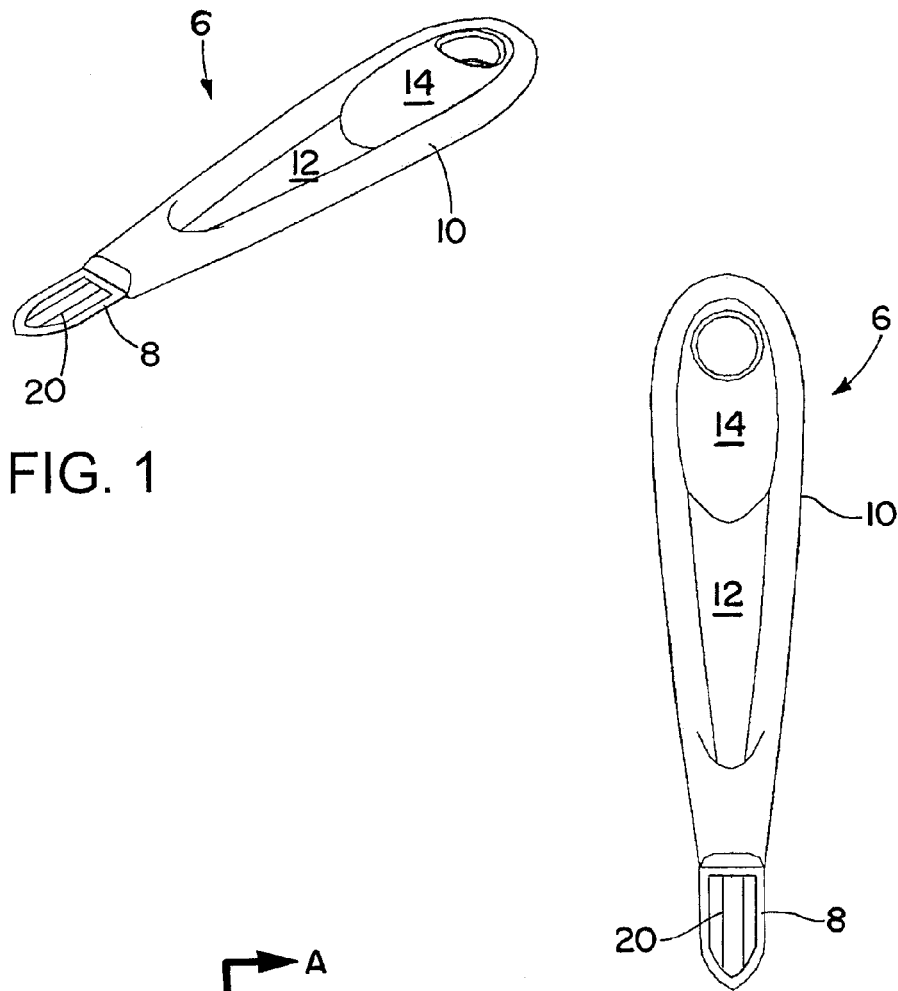
FIG. 1
FIG. 2
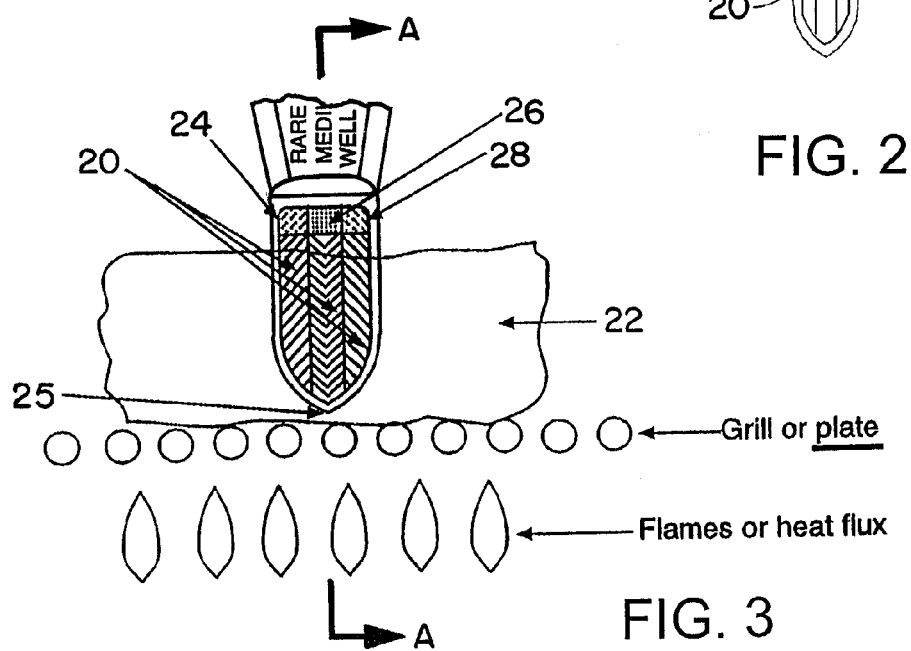
FIG. 3

INTERNAL TEMPERATURE MEASURING DEVICE

FIELD OF THE INVENTION

The present invention relates to a device for determining the temperature distribution of a substrate such as meat, poultry or fish during cooking.

BACKGROUND OF THE INVENTION

Barbecuing meat, poultry or fish on an open fire can present the chef with many cooking variables in order to determine when the food is done. The heat may not be uniform, the thickness of the meat can be variable, and the standard doneness measurement such as "rare", "medium" or "well done" can be quite subjective. Also, the relative thickness of the item being cooked can influence the amount of time necessary for proper preparation. For instance, cooking time might vary dramatically for a thin hamburger versus a thick steak. Similar variables occur with ovens and stoves due to temperature fluctuations of the heat source.

When meat, poultry, fish, etc. is heated for cooking (e.g., placed on a barbeque fire or in a hot oven, etc.) the surface of the food closest to the heat source will increase in temperature and a temperature gradient will occur across the thickness of the food with time as heat diffusion occurs. As such, the food will typically have a temperature gradient across the thickness of the food wherein, for example, portions of the food closest to the heat source will be hottest and portions of the food farthest from the heat source will be coolest. Accordingly, measuring the temperature at a single point within the food in order to determine the doneness of the food may not provide an accurate result.

One way to check the doneness of meat is to make a cut in the meat to visually observe the interior doneness during the cooking process. This method, however, is quite subjective and may allow internal juices to be lost thereby drying out the food. Another solution has been the use of irreversible thermochromic materials which, when placed in contact with the food, will show if the food has exceeded some critical temperature related to the doneness and/or safety of the food for eating (e.g., above some critical temperature that can kill bacteria). For example, a product called "T. Stick", which is disclosed in U.S. Pat. No. 5,622,137 and sold by M. E. Heuck Co., uses an irreversible thermochromic material to show if meat, poultry, or pork has exceeded a given temperature. Another example of a product using irreversible indicators was patented by Hans O. Ribi. The Ribi device uses irreversible indicators that are coated onto a plastic probe as set forth in U.S. Pat. Nos. 5,685,641 and 5,918,981. Other Ribi devices include indicators that are small discreet reversible thermochromics dipped on a metal cylindrical carrier. Such devices, however, only measure temperature at a discreet point within the food.

Another product designed to aid in cooking is the "Tempfork", developed by Mr. Richard Murtagh. The Tempfork uses a thermocouple or similar sensor disposed in the tines of a fork to probe the food and sense the temperature. This expensive battery-operated device is reusable, but only gives a temperature measurement at the localized point of insertion. Since the temperature measurement is localized, it can be inaccurate particularly when cooking food on an open fire (e.g., a grill) which typically has hot spots. In addition, the device creates a hole in the meat that, upon withdrawal of the device, generally remains open and allows juices to escape the meat.

All these products have a common design fault—they indicate the temperature or peak temperature at a particular location within the food even though the food may have a wide range of temperatures at various other locations. As mentioned, measuring the temperature at a single point within the food in order to determine the doneness of the food may not provide an accurate result.

SUMMARY OF THE INVENTION

The present invention relates to a reusable device that accurately determines the internal temperature distribution of a substrate such as meat, poultry or fish during cooking. The present invention measures and displays temperature across a plane of the substrate rather than a specific point within the substrate. Accordingly, by measuring temperature at more that one point within the substrate, the invention avoids many false reading problems associated with hotspots in the substrate and/or on the grill, oven, or other heat source.

The present invention uses one or more thin metal blades, for example stainless steel, with one or more thermochromic stripes bonded thereto. The thin metal blade, having a large surface area to mass ratio is heated rapidly when inserted into the substrate as heat is conducted from both sides of the heated substrate. Unlike other types of temperature measuring devices, the low mass of the blade generally avoids cooling of the substrate adjacent to the indicator. Further, the thin blade enables the use of a relatively large thermochromic area or stripe so that color changes can be more easily seen even from a distance away. The thin blade also tends not to perturb the food as much thereby keeping juices in.

More particularly, an internal temperature measuring device for determining the temperature of a substrate comprises a metal carrier configured for insertion into the substrate, and at least one stripe of thermochromic material mounted to the metal carrier. The thermochromic stripe can be mounted to the metal carrier such that a planar extent of the stripe extends in a direction parallel to the direction in which the metal carrier can be inserted into the substrate.

In one exemplary embodiment, the at least one stripe of thermochromic material is an opaque thermochromic material and covers at least a portion of a colored indicator on the metal carrier. The thermochromic material becomes transparent in response to exposure to a certain temperature thereby exposing the underlying colored indicator. A portion of the colored indicator is not covered by the at least one stripe of thermochromic material thereby allowing comparison between the uncovered portion of the colored indicator and the covered portion of the colored indicator after the metal carrier is removed from the substrate for easily determining the temperature of the substrate. Other indicators, such as words, images etc. can also be used alone or in addition to the colored indicators to aid the user in determining the temperature of the substrate.

The metal carrier can be stainless steel and include a pointed tip to facilitate insertion into the substrate. The leading edge of the at least one stripe can be generally flush with a surface of the metal carrier so as to shield the at least one stripe from shear forces being applied thereto during insertion into the substrate. In this regard, the metal carrier can include at least one ridge on a side thereof, wherein the ridge is disposed adjacent to the at least one stripe and has a height corresponding to a thickness of the at least one stripe. The metal carrier may include a recess in which the at least one stripe is mounted so as to shield the at least one stripe from shear forces being applied thereto during insertion into the substrate. The internal temperature measuring device can include a handle having at least one passageway for allowing air to circulate through the handle. The handle can have a generally hollow tear drop shape.

In accordance with another exemplary embodiment, the at least one thermochromic stripe is responsive to a first temperature, and a second thermochromic stripe is provided wherein the second thermochromic stripe is responsive to a second temperature. The first temperature can correspond to a first state of doneness of a food, and the second temperature can correspond to a second state of doneness of the food.

In accordance with another aspect of the invention, an internal temperature measuring device for determining the temperature of a substrate comprises a frame and at least one stripe of thermochromic material disposed within said frame.

DRAWINGS

FIG. 1 illustrates a perspective view of an exemplary temperature measuring device in accordance with an embodiment of the invention;

FIG. 2 illustrates a top view of the exemplary device of FIG. 1;

FIG. 3 illustrates a front view of the exemplary device of FIG. 1 inserted in a substrate;

DETAILED DESCRIPTION

Figure 4:
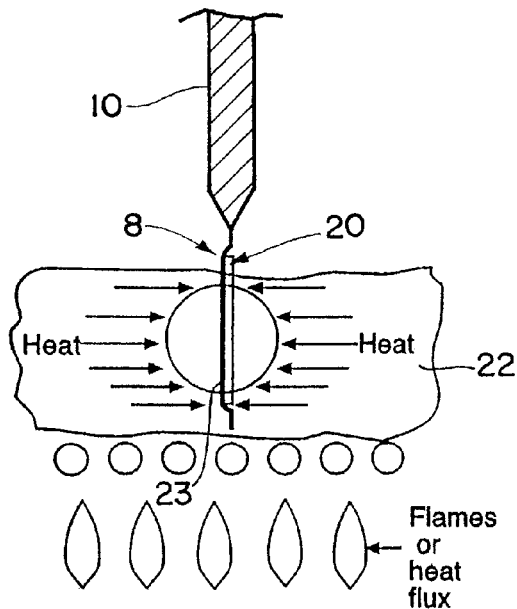
FIG. 4 illustrates a cross-sectional view of the exemplary device of FIG. 3 taken along line A-A'.

The present invention provides a device which can be inserted into or placed in contact with a substrate for determining the temperature gradient across the substrate. This provides a more accurate indication of temperature than the local reading obtained by simply inserting a thermometer into a substrate. In one embodiment, the present invention enables determining the temperature of food during cooking, but does not take a single, isolated reading of the temperature at the point in which it is inserted in the food. Instead, the invention enables determining temperature distribution across a plane of the food resulting in a more accurate measurement.

Turning to FIGS. 1-5, and initially to FIGS. 1 and 2, an exemplary temperature measuring device 6 in accordance with the invention will be described. The temperature measuring device 6 includes a metal carrier 8 secured to a handle 10 having a generally teardrop shape. The handle 10 can be made of stamped or cast metal, for example. The center of the handle is open thereby providing a passageway 12 for air to circulate to dissipate heat from the handle 10. A handle insert 14 is provided and can be made of a nonslip material, such as rubber, to enhance a user's grip during use of the device 6. As will be described, the metal carrier 8 can include one or more stiffening ribs or ridges for increasing the rigidity of the carrier 8. As shown, the carrier 8 can be curved and/or pointed and provided with a sharpened edge to aid in penetrating a substrate.

Figure 5:
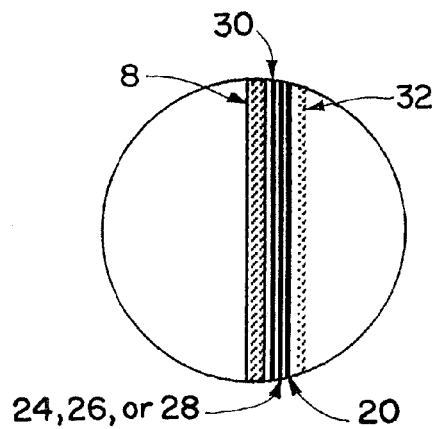
FIG. 5 illustrates an enlarged side view of the exemplary device of FIG. 3.

As best seen in FIGS. 3-5, one or more reversible thermochromic stripes 20 are provided to determine the temperature gradient in a substrate and display such information to a user. The thermochromic stripes 20 are mounted to the carrier 8 in a manner such that when inserted into a substrate 22, the longitudinal dimension (e.g., length) of the thermochromic stripes 20 are parallel to the direction in which the carrier 8 is inserted into the substrate 22. It will be appreciated that the temperature of the substrate 22 can vary from point to point within the substrate 12 depending on thickness and a variety of other factors. Accordingly, the device 6 can determine the temperature distribution for the substrate 22, not just a localized point of the substrate 22. This is particularly advantageous when checking the doneness of a piece of meat. For example, a typical piece of meat will be cooler at its center than at its outer surfaces. When the carrier 8 is inserted into the substrate 22 in a direction that corresponds with the thickness of the piece of meat the temperature distribution of the meat across a cross-section of its thickness can be observed thereby allowing a user to determine with accuracy the doneness of the meat.

A thermochromic material, for example the one or more thermochromic stripes 20, is mounted on the metal carrier 8. The thermochromic stripes 20 can be mounted to the carrier 8 using a suitable adhesive, or may be printed, painted or may be adhered directly on the metal carrier 8 in a recessed region after the metal carrier 8 has been embossed. The flat bladelike metal carrier 8 allows use of relatively large thermochromic stripes 20 (as compared to other carrier shapes, for example, a cylinder) thereby allowing color changes of the thermochromic stripes 20 to be more easily seen. A thermochromic material (e.g., a polymeric thermochromic), as used herein, includes any material that changes color based on a change in temperature. It will be appreciated that although the terms thermochromic material and/or thermochromic stripe may be used in the singular form herein, various different thermochromic materials may constitute the thermochromic stripe 20. For example, in FIG. 3 three different thermochromic materials, each responsive to different temperatures, comprise the thermochromic stripe 20.

The metal carrier 8 can be an embossed as illustrated (FIG. 4) or flat, as desired. An embossed thin metal carrier 8 can be desirable for increasing the stiffness of the carrier 8 while keeping the thickness of the carrier 8 minimal. A thinner carrier 8 results in less trauma to the substrate (e.g., meat, such as steak, chicken fish, etc.) during insertion of the carrier portion 8. Further, the embossed carrier 8 can shield the thermochromic stripes 20 from shear forces being applied thereto during insertion into the substrate 22 which can prevent the thermochromic stripes 20 from peeling off. For example, as illustrated in FIG. 4 the carrier 8 includes a recess 23 in which the thermochromic stripes 20 are mounted such that the thermochromic stripes 20 are generally flush with the carrier 8 and thereby shielded from shear forces being applied thereto. During use, a tip 25 of the carrier 8 may contact a grill or plate, but the heat sensitive reversible thermochromic material 20 will typically be some distance away (e.g., $\frac{1}{16}$-$\frac{3}{16}$ inch) from the heat source (e.g., flames) so that the surrounding meat will prevent the thermochromic material 20 from exposure to high temperatures that may cause degradation.

The thermochromic stripes 20 are mounted to the carrier 8 over one or more indicators, such as bright passive color indicators. In FIG. 3, yellow 24, green 26, and red 28 passive color indicators are illustrated. It will be appreciated that virtually any desired color can be used for a passive color indicator. The thermochromic stripes 20 may be embossed in the metal carrier 8 to stiffen the carrier 8 while also preventing the thermochromic stripes 20 from peeling or shearing off the carrier 8, as previously described. While stainless steel has many thermal advantages and is the preferred material for the metal carrier 8, other metals (Iron, Titanium, etc.) may be used. Instructional information can be provided on the carrier 8 or handle 14. For example, words or pictures can be used to indicate what each thermochromic stripe is designed to determine. Such information can include the type of food, the state of doneness of the food corresponding to each thermochromic stripe 20, etc.

Turning to FIG. 5, a cross-sectional view of the carrier portion 8 of the temperature measuring device 6 is illustrated showing the metal carrier 8, the passive color indicators, 24, 26, and 28, and thermochromic stripe 20. The thermochromic stripe 20 can be mounted to the carrier 8 with a suitable adhesive, such as high temperature adhesive 30. A transparent film 32, such as a polymer, a polycarbonate, a polyester, etc. can be provided as a protective covering over the thermochromic stripe 8.

Returning to FIG. 4, after some period of time when the substrate 22, which may typically be meat, has been on the grill (depending on the thickness and heat), the chef will insert the carrier portion 8 of the device 6 into the meat as illustrated. Heat will diffuse into the device 6 rapidly heating the metal carrier 8 and the thermochromic stripe 20. In general, no more than about five seconds is required to take a reading depending on the thickness of the carrier 8.

Upon removal of the blade to view the color change, because air is a poor conductor, the thermochromic material if sufficiently heated will remain in a changed state for a period of time, preferably several seconds, to allow the chef time to read the device. For example, the cooling curve for the device when removed from the substrate is shown by the following equation:

$$\frac{T_\infty - T}{T_\infty - T_o} = e^{-(hA/PCV)t}$$

Where $T$ = Temperature of the device °F or C at any time
$T_o$ = Temperature of the device upon removal
$h$ = Convection(air) coefficient
$A$ = Area(in$^2$) unit area
$P$ = Density #/in$^3$
$C$ = Specific heat BTU/
$V$ = Volume(thickness × unit area)
$t$ = Time
$T_\infty$ = The final equilibrium temperature Accordingly, it will be appreciated that the relatively slow rate at which the carrier 8 cools in air (as compared to the rapid rate of heating of the carrier 8 when inserted into a substrate) allows time for the user to visually see the color change before the thermochromic reverts back to its original color.

The carrier 8 will generally not reach thermal equilibrium but will be from 5% to 10% of equilibrium. In general, if the meat is at a greater temperature than the temperature to which the thermochromic material is responsive, the thermochromic stripe 20 will change color completely. For example, a Matsui material which has a specified turn-on temperature of 47° C. would turn from black to clear when the meat is at 52-53° C. Accordingly, if the thermochromic stripe 20 covering the yellow passive color indicator 24 is composed of such material and the meat is above a temperature of about 52-53° C., the thermochromic material would change from black to transparent thereby allowing yellow passive color indicator 24 to be seen and thereby indicating the meat is rare. If the center of the meat is cool, the center portion of the thermochromic stripe 20 may remain unchanged in color and therefore only the sides of the thermochromic stripe 20 corresponding to the portions of the meat that have heated sufficiently would become transparent thereby allowing the yellow passive color indicator 24 to be seen. This, in effect, would show the temperature distribution in the substrate 22. The yellow passive color indicator 24 is not entirely covered with by the thermochromic stripe 20 so that the chef or user can compare the cleared thermochromic stripe 20 with the base passive color indicator to determine if the thermochromic material has completely changed color.

The second stripe (e.g., the thermochromic stripe covering the green passive color indicator 26) may be responsive to 50° C. and the meat temperature would therefore generally have to exceed approximately 55-56° C. to transform the thermochromic stripe completely. Again, if the center is cooler, this stripe may not change color entirely. The third stripe (e.g., the thermochromic stripe covering the red passive color indicator 28) may be responsive to 55° C. and the meat temperature would therefore generally have to exceed approximately 60-61° C. to transform the thermochromic stripe completely.

It will be appreciated that the thermochromic material may be mounted on a thin stainless steel carrier 8 or other similar poor metal conductor. This is done to generate a rapid response once the carrier 8 is in contact with the substrate 22 whose temperature is being measured. The thin metal carrier 8 will generally have a low thermal mass to prevent the metal carrier 8 from cooling the surrounding meat and causing an inaccurate temperature reading. The low thermal mass also allows the carrier 8 and thermochromic stripe to be heated rapidly via conduction on both sides by the substrate 22

Figure 6:
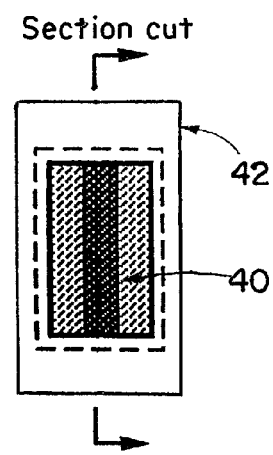
FIG. 6 illustrates another exemplary temperature measuring device in accordance with an embodiment of the present invention.
Figure 7:
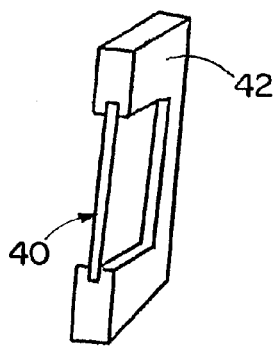
FIG. 7 illustrates a cross-sectional view of the exemplary device of FIG. 6.

In another embodiment of the present invention, as illustrated in FIGS. 6 and 7, thermochromic material 40 may be mounted in a frame 42 for thermal isolation. The frame may be of any suitable material such as metal or plastic. Such an embodiment can be utilized for immersion into vats of liquids, amongst other things.

Figure 8:
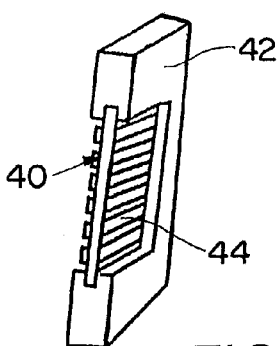
FIG. 8 illustrates a cross-sectional view of an exemplary temperature measuring device including a discontinuous metal mass in accordance with an embodiment the present invention.

In addition to fast response time and little or no transverse cooling, one may increase the viewing time by incorporating discreet masses or discontinuous metal 44 in contact with the polymer film as illustrated in FIG. 8.

It will be appreciated that any suitable thermochromic material can be used in accordance with the invention. For example, Matusui's reversible thermochromic materials, macro encapsulated Mercury Chloride, or high temperature memory liquid crystal materials supplied by David Liquid Crystals, as well as reversible Poly Di Acetylene materials. It will also be appreciated that some thermochromics exhibit a certain amount of hysteresis (e.g., resistance to change back to original color upon cooling) that can be desirable for prolonging the amount of time a user has to take a reading after removing the carrier from the substrate.

While most of the applications are concerned with barbecuing or cooking and preparation of food, this same concept may be used for many other applications such as determining the temperature inside of a carton of produce such as refrigerated chicken, lettuce, steaks, etc. Here the probe with the thermochromic materials is mounted on a sharp piercing metal carrier that can puncture the carton and reveal the temperature distribution through the carton. A similar device can be used to determine if recently cooked food has been cooled down under refrigeration to a safe temperature within a given amount of time so bacteria will not grow.

Other applications using this invention may be determining the temperature distribution in a hay bale so as to detect heat given off from a bacterial action which can cause spontaneous combustion. For farmers wanting to know if the soil is warm enough for seed germination, a metal spike with various thermochromic formulations on it may be pounded into the ground. This rugged device when retracted would show the soil temperature distribution.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An internal temperature measuring device for determining the temperature of a substrate comprising:
   a metal carrier configured for insertion into the substrate;
   at least one stripe of thermochromic material mounted to the metal carrier; and
   a handle connected to the metal carrier, the handle having a generally hollow teardrop shape with at least one passageway for allowing air to circulate through the handle to dissipate heat from the handle;
   wherein the thermochromic stripe exhibits a cooling hysteresis thereby resisting changing color upon cooling, whereby the time period for viewing the color change is increased.

2. An internal temperature measuring device as set forth in claim 1, wherein the at least one stripe of thermochromic material is mounted to the metal carrier such that a planar extent of the at least one stripe extends in a direction in which the metal carrier can be inserted into the substrate.

3. An internal temperature measuring device as set forth in claim 1, wherein the at least one stripe of thermochromic material is an opaque thermochromic material and covers at least a portion of a colored indicator on the metal carrier, and wherein the thermochromic material becomes transparent in response to exposure to a certain temperature thereby exposing the underlying colored indicator.

4. An internal temperature measuring device as set forth in claim 3, wherein at least a portion of the colored indicator is not covered by the at least one stripe of thermochromic material thereby allowing comparison between the uncovered portion of the colored indicator and the covered portion of the colored indicator after the metal carrier is removed from the substrate.

5. An internal temperature measuring device as set forth in claim 1, wherein the metal carrier is a poor metal conductor.

6. An internal temperature measuring device as set forth in claim 5, wherein the metal carrier is stainless steel.

7. An internal temperature measuring device as set forth in claim 1, wherein the metal carrier further comprises a pointed tip to facilitate insertion into the cooking food.

8. An internal temperature measuring device as set forth in claim 1, wherein the metal carrier is a thin blade-like member for insertion into a food substrate.

9. An internal temperature measuring device as set forth in claim 1, wherein a leading end of the at least one stripe is generally flush with a surface of the metal carrier so as to shield the at least one stripe from shear forces being applied thereto during insertion into the substrate.

10. An internal temperature measuring device as set forth in claim 9, wherein the metal carrier includes at least one ridge on a side thereof, wherein the ridge is disposed adjacent to the at least one stripe and has a height corresponding to a thickness of the at least one stripe.

11. An internal temperature measuring device as set forth in claim 1, wherein the metal carrier includes a recess in which the at least one stripe is mounted so as to shield the at least one stripe from shear forces being applied thereto during insertion into the substrate.

12. An internal temperature measuring device as set forth in claim 1, wherein at least two stripes of thermochromic material is embossed onto said metal carrier.

13. An internal temperature measuring device as set forth in claim 1, wherein the at least two stripes of thermochromic material are mounted to the metal carrier with an adhesive.

14. An internal temperature measuring device as set forth in claim 1, further comprising instructional information provided on the device corresponding to usage of the device.

15. An internal temperature measuring device as set forth in claim 1, wherein the at least one thermochromic stripe is responsive to a first temperature, and further comprising a second thermochromic stripe, wherein the second thermochromic stripe is responsive to a second temperature.

16. An internal temperature measuring device as set forth in claim 15, wherein the first temperature corresponds to a first state of doneness of a food, and the second temperature corresponds to a second state of doneness of the food.

17. An internal temperature measuring device as set forth in claim 1, further comprising a transparent protective substrate covering at least a portion of the thermochromic stripe through which a user can view color change of the thermochromic stripe.

* * * * *